Dec. 6, 1966 R. SIEBURG 3,289,539
METHODS AND APPARATUS FOR PRODUCING TEST SPECIMENS
Filed Oct. 4, 1965 3 Sheets-Sheet 1
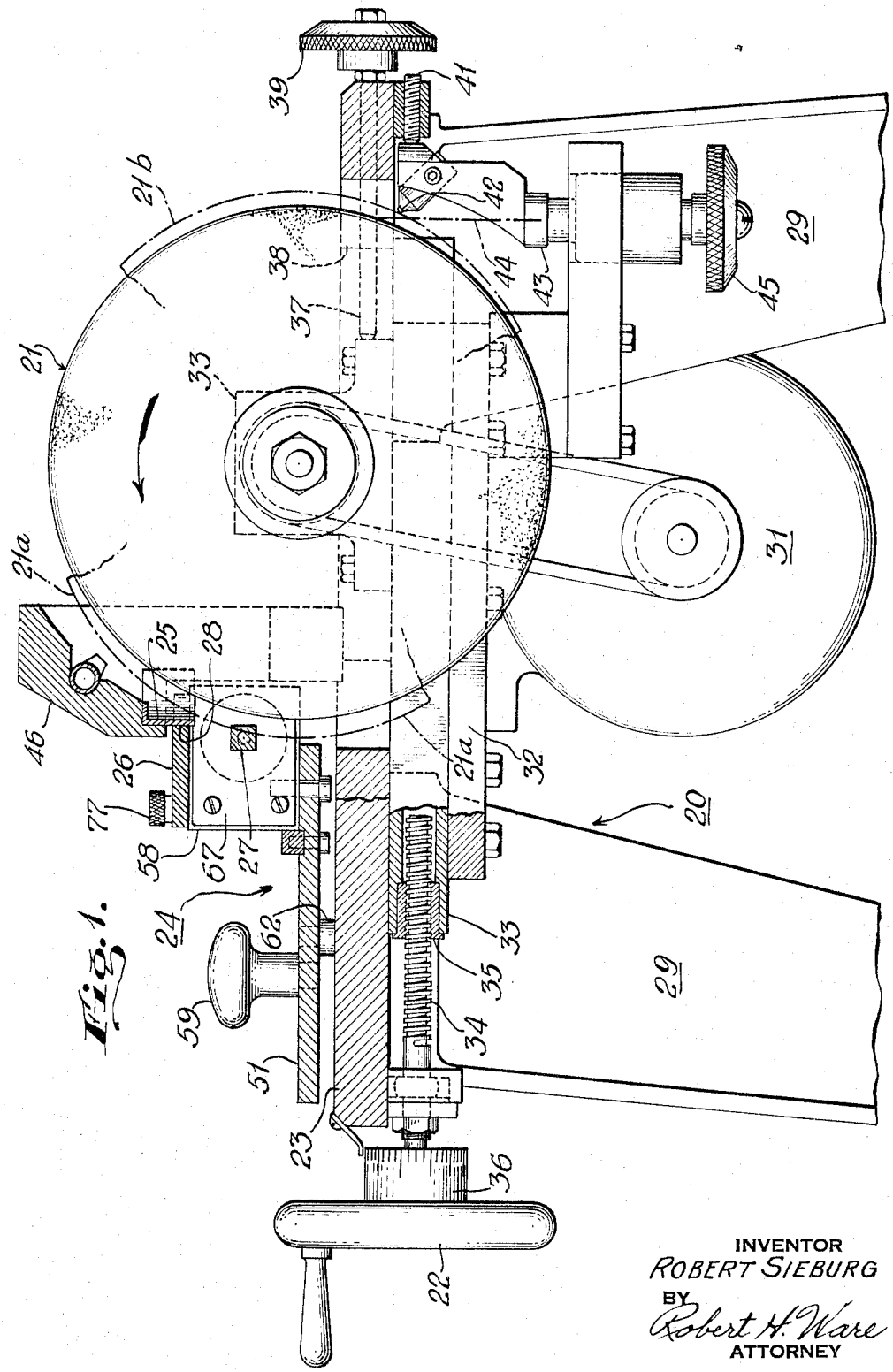
INVENTOR
ROBERT SIEBURG
BY
Robert H. Ware
ATTORNEY Dec. 6, 1966   R. SIEBURG   3,289,539
METHODS AND APPARATUS FOR PRODUCING TEST SPECIMENS
Filed Oct. 4, 1965   3 Sheets-Sheet 2
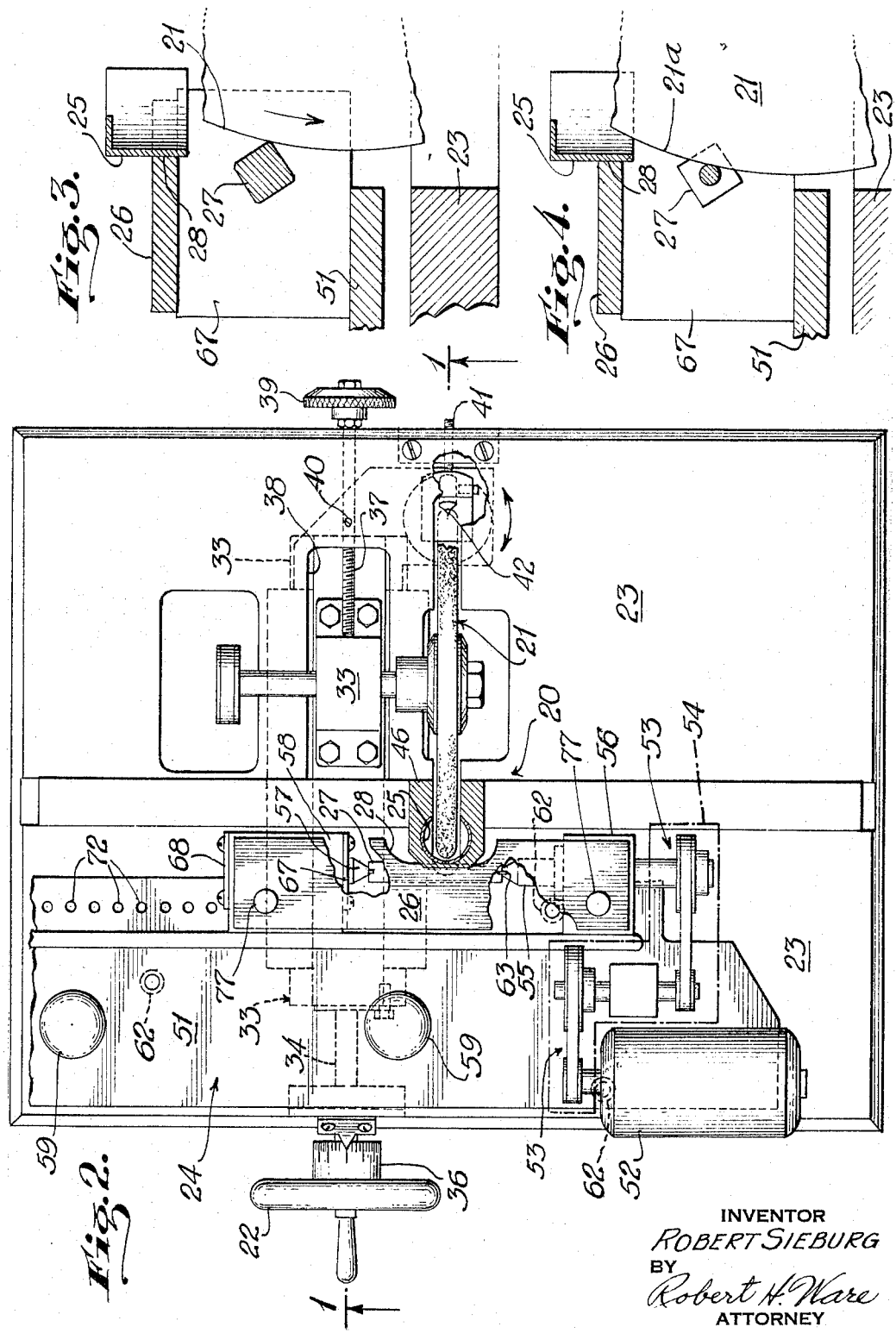
INVENTOR
ROBERT SIEBURG
BY
Robert H. Ware
ATTORNEY

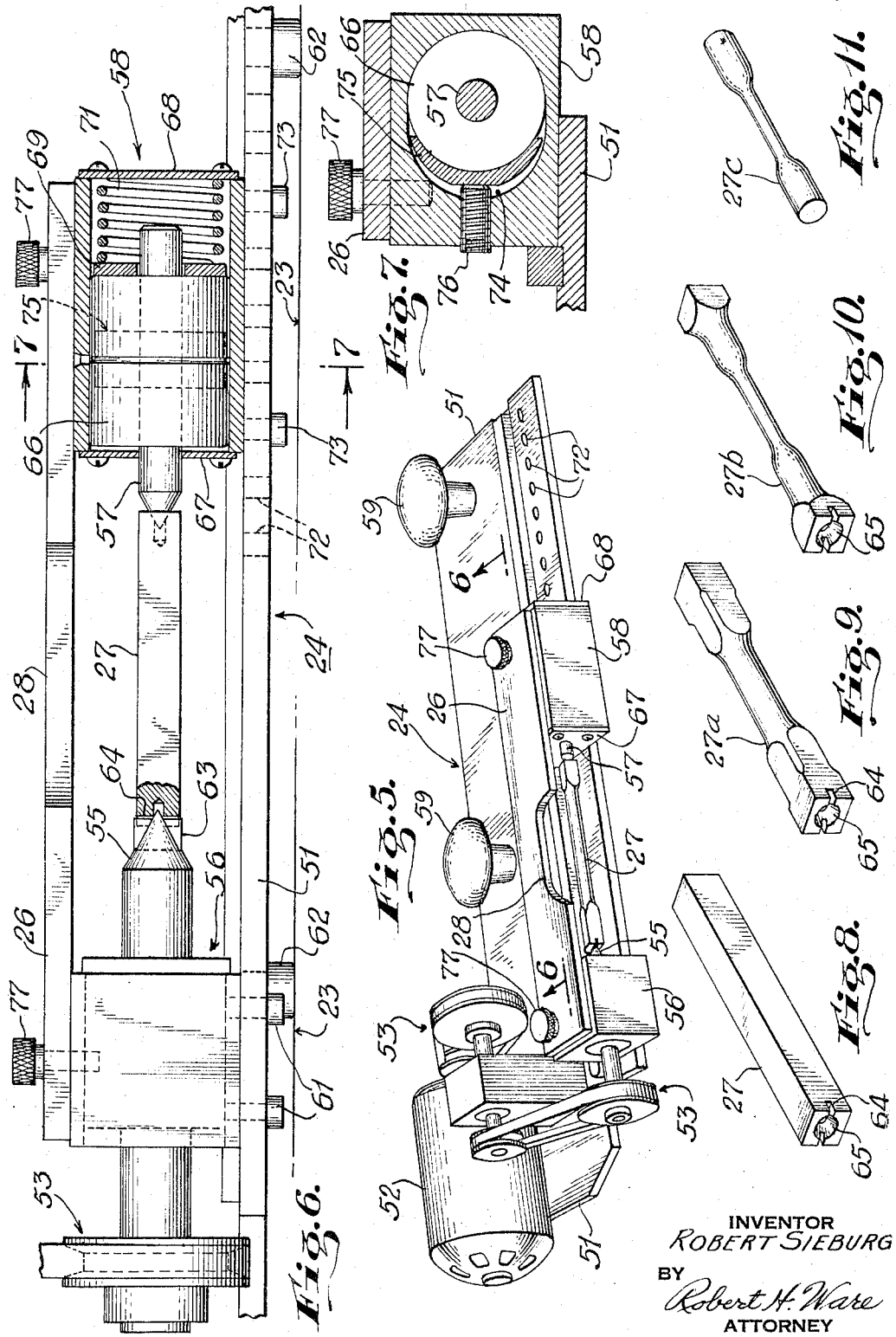

United States Patent Office 3,289,539
Patented Dec. 6, 1966

3,289,539
METHODS AND APPARATUS FOR PRODUCING TEST SPECIMENS
Robert Sieburg, New Fairfield, Conn. (% Sieburg Industries, Inc., Danbury Industrial Park, Danbury, Conn.)
Filed Oct. 4, 1965, Ser. No. 492,710
14 Claims. (Cl. 90—13)

This invention relates to methods and apparatus for making test specimens, and particularly to methods and apparatus for producing highly accurate test specimens by milling and grinding techniques utilizing high-velocity milling cutters or grinding wheels advanced with extremely fine rates of feed. The techniques of this invention produce metallic or non-metallic test specimens of predetermined size and shape with extremely high precision, and with no appreciable cold-working or deleterious heat generation at the machined surface of the specimens.

Conventional techniques for producing tensile test specimens used for determining the tensile strength of sheet materials, plastics, bar stock, plate and the like employ slow-moving milling cutters advanced at coarse rates of feed to cut away chips of substantial thickness in continuous succession. This produces severe cold-working effects at the machined surface of the material and destroys the normal crystal structure, producing undesired "heat treatment" effects and sometimes actual edge fracture lines and points of stress concentration in the completed specimen.

A universal procedure for preparing sheet and plate specimens uses a vertical milling machine with an end mill turning at relatively slow r.p.m. The heavy chip load and cutting pressures require the samples to be securely clamped with back-up plates to prevent excessive edge deformation while coolants must be used to prevent burning of the metal. The severity of induced cold working is dependent on the skill of the machinist, the traverse speeds used and the sharpness of the cutter. The "free hand" ability of the operator controls the specimen configuration, or expensive tracing attachments must be used. The individual samples must be hand finished to remove surface deformation and achieve the required .003" blended taper in the gauge area with no "undercutting" in the shoulder radii.

Round test samples from rods, castings, forgings, and similar shapes are prepared on precision lathes and require even greater machining skills and care than required with milling "flats." The stock is rotated at slow speeds and a single point tool rigidly supported removes the metal with heavy cutting pressures that require high horsepower motors and geared down drives. The machinist's ability determines the accuracy of the specimen configuration, while the lathe speeds, coolants, tool sharpness and depth of cut controls the amount of metal distortion produced in the sample.

A lathe operator with machining experience on tensile test bars is necessary to accurately and evenly hand blend the taper in the gauge section. Although an expensive tracing attachment can be utilized when the quantity of specimens justifies the cost, a skilled machinist is still required to hand finish the specimens to remove stress raising tool marks and cold working inevitably present in the surfaces of the gauge area. When laboratories are testing both flat and round tensile specimens, the machine shop requires *both* a precision lathe and a precision milling machine plus operators with combined skills.

My Patent No. 2,896,511 describes my "Tensil Kut" machine for making tensile test specimens, employing a high speed milling cutter rotating at speeds up to 20,000 r.p.m. and employing a guide sleeve 27 progressively withdrawn to govern the successive advances of a flat specimen clamped between template bars and positioned by the operator in engagement with the guide sleeve. That machine provides extremely low rates of feed and correspondingly fine successive machining cuts in the edge of the specimen material until the specimen has been machined to the shape determined by the preselected templates between which it is gripped and clamped.

The present invention incorporates significant improvements over the techniques shown in that "Tensil Kut" patent, and it provides the advantages of high cutting speed and extremely low feed rates in methods and apparatus for preparing specimens having round cross sections.

The methods and apparatus of this invention are adapted to produce specimens of circular cross section by employing a separate, portable, manually-positioned lathe device 24 called the "TensiLathe" unit, in which the desired workpiece 27 is a length of specimen material clamped between centers and rotated during the specimen-machining operation. This device may be used for high speed machining of the revolving specimen at very low rates of feed, either with a high-speed grinding wheel successively advanced by fine feed increments, or with the "Tensil Kut" machine shown in my Patent No. 2,896,511, employing a high-speed milling cutter cooperating with a guide sleeve which is successively withdrawn in fine feed increments.

The methods and apparatus of this invention may also be used with such high-speed, low feed-rate machining operations for final polishing and finishing of such workpieces as tensile test specimens of circular cross sections, and this invention is well adapted to eliminate the need for costly high precision specimen-machining procedures, for it permits the preparation of test sample specimens by unskilled personnel having a minimum of training.

Accordingly, a principal object of the invention is to provide methods and apparatus for producing test specimens of circular cross section with maximum speed and convenience at minimum cost.

Another object of the invention is to provide a portable, manually positioned lathe device for rotating workpieces whose surfaces are to be machined.

Other and more specific objects will be apparent from the features, elements, combinations and operating procedures disclosed in the following detailed description and shown in the drawings, in which:

FIGURE 1 is a fragmentary, sectional side elevation view of a form of apparatus useful in practicing the methods of this invention, including an adjustable high-speed grinding wheel and a portable, manually positioned lathe device for rotating a workpiece at the grinding station.

FIGURE 2 is a fragmentary top plan view, partially broken away, showing the appartus of FIGURE 1.

FIGURE 3 is an enlarged, fragmentary, schematic sectional end elevation diagram of the workpiece and the grinding wheel at the beginning of the machining operation, and FIGURE 4 is a similar diagram of the workpiece and grinding wheel at the conclusion of the machining operation.

FIGURE 5 is a perspective view of a portable lathe device employed in the methods of the present invention.

FIGURE 6 is a fragmentary, enlarged front elevation view of the headstock and tailstock portion of the lathe device shown in FIGURE 5.

FIGURE 7 is a fragmentary sectional end elevation view of the tailstock portion of the portable lathe device shown in FIGURE 6, taken along the line 7—7 in FIGURE 6, and FIGURES 8 through 11 are perspective views of the same workpiece at successive stages of its evolution from a square bar into a round tensile test specimen of standard size and shape.

Shown in FIGURE 1 is a grinding machine 20 which I have marketed under the name "Tensil Grind," incorporating a high-speed grinding wheel 21 mounted on a wheel shaft journalled in a slidable wheel bearing block 33, and wheel 21 may thus be moved forwardly and rearwardly between the extreme positions 21a and 21b shown in dot dash lines in FIGURE 1 controlled by a manual feed wheel 22.

Manually maneuverable upon a worktable 23 located between the feed wheel 22 and the grinding wheel 21 is a portable "TensiLathe" lathe device 24 shown in the perspective view of FIGURE 5, and its details of construction are seen in the enlarged fragmentary sectional views of FIGURES 6 and 7, as well as in FIGURES 1 and 2.

As shown in FIGURES 1 and 2, the forward or cutting edge of grinding wheel 21 is positioned within a partial cylindrical guide sleeve 25 whose convex exterior surface is presented forwardly toward the work station above worktable 23 at feed wheel 22. A template 26 of predetermined shape is clamped on lathe device 24 immediately above the workpiece 27, which is held between the headstock 55 and tailstock 57 of device 24, and template 26 is formed with a guide surface 28 of predetermined shaped positioned to be brought into abutting juxtaposition with the guide sleeve 25.

By moving the portable lathe device 24 from side to side while maintaining template guide surface 28 against guide sleeve 25, an unskilled operator may present the entire effective length of workpiece 27 to the cutting surface of grinding wheel 21 to complete one "cut." Feed wheel 22 may then be advanced by a selected amount to advance grinding wheel 21 toward the worktable 23 by the selected fine feed increment, and portable lathe device 24 may again be moved from side to side with guide surface 28 of template 26 maintained in contact with guide sleeve 25 until a second "cut" has been completed. In this manner, using a single template 26, a selected length of bar stock 27 may be turned from its square cross section shown in FIGURE 8, through the successive stages 27a and 27b of FIGURES 9 and 10, to the final polished specimen 27c shown in FIGURE 11 having its diameters, lengths and radii of curvature predetermined to meet standards established by the American Society for Testing Materials or other professional societies.

The "Tensil Grind" machine

Supplementing the description of my "Tensil Kut" machine shown in my United States Patent No. 2,896,511, the grinding machine shown in FIGURES 1 and 2 which I have called the "Tensil Grind" machine provides similar high speed machining capability with selectable low rates of feed. In this device, the worktable 23 is supported on a rigid frame including legs 29. Drive motor 31 is anchored beneath a motor plate 32 forming a lower portion of a guideway for the slidable wheel bearing block 33 shown in FIGURES 1 and 2. The forward portion of the wheel bearing block 33 extends under the worktable 23 toward feed wheel 22 for threaded engagement with the feed screw 34, journalled beneath the forward edge of worktable 23, and turned by the rotatable manual feed wheel 22 as shown in FIGURE 1. A feed nut 35 secured in the forwardly extending portion of the wheel block 33 converts the rotary movement of feed screw 34 into longitudinal sliding forward or backward movement of wheel bearing block 33, advancing or retracting the grinding wheel 21. A feed dial 36 is incorporated as part of the feed wheel 22 and allows the operator to advance the grinding wheel 21 by a precise feed increment desired. Thus the grinding wheel 21 may be advanced toward feed wheel 22 in the feed increments desired until it reaches the limit position 21a in FIGURE 1.

Wheel dressing attachment

A convenient wheel dressing attachment is shown at the right hand side of FIGURES 1 and 2 for use in maintaining the grinding wheel periphery semi-circular in cross section, which is useful in grinding the shoulder curvatures shown in FIGURES 10 and 11. This attachment includes a threaded wheel dressing stop shaft 37 extending through a threaded hole in the rear portion of worktable 23 from its rear edge into a central aperture 38 accommodating the upstanding wheel bearing block 33. The protruding rear end of the threaded dressing stop shaft 37 is provided with a hand wheel 39 secured thereon and used to advance the dressing stop 37 through its threaded aperture toward the bearing block 33. The forward end of the shaft 37 is positioned to act as a stop blocking the rearward motion of the bearing block 33 at the urging of feed wheel 22. When dressing stop shaft 37 is in the desired position, a set screw 40 is tightened to hold shaft 37. Reverse rotation of feed wheel 22 thus retracts wheel bearing block 33 to its stop position against stop shaft 37, where the driving wheel 21 is in dressing position 21b. In this position wheel 21 is in contact with a dressing tool 42 protruding toward the rim of wheel 21 and clamped in a dressing frame 43 which is mounted in the rigid frame for pivoting movement about dressing axis 44, actuated by manual dressing wheel 45 mounted at the lower end of dressing frame 43. The pivoting movement of frame 43 about axis 44 produces arcuate movement of dressing tool 42 about axis 44, since the dressing tool 42 is clamped in frame 43 in a position slightly spaced away from axis 44. Furthermore, axis 44 passes through the center of curvature of the desired semi-circular cross section of the peripheral edge of wheel 21 to be generated by pivoting motion of dressing tool 42. During pivoting, dressing frame 43 is in sliding contact with the abutting end of a back-up screw 41 which is adjusted to provide support preventing deflection of dressing frame 43 during its pivoting dressing motion. Adjustment of the clamped position of dressing tool 42 and stop shaft 37 thus permits accurate dressing of the periphery of wheel 21 as it wears away.

The guide sleeve

Guide sleeve 25 embracing the forward edge of cutting wheel 21 above the cutting station of worktable 23 is fixedly secured in a slotted pedestal 46, likewise embracing the forward edge of wheel 21, thus firmly anchoring the guide sleeve 25 in position for sliding engagement of template 26 thereon as the operator moves the lathe device 24 from side to side during each cutting operation.

Portable lathe device

The portable lathe device 24 which I call the "TensiLathe" is well adapted for use with suitable templates in cooperation with my "Tensil Kut" machine shown in my Patent No. 2,896,511 or in my "Tensil Grind" machine shown in FIGURES 1 and 2. As shown in FIGURES 1, 2 and 5, the portable lathe device 24 includes various sub-assemblies mounted on a base plate 51, including a lathe drive motor 52, a speed reducing chain 53 of sheaves and belts enclosed in a belt cover 54, a headstock 55 mounted in a headstock bearing housing 56, and a tailstock 57 mounted in a tailstock bearing housing 58. The belts 53 connecting motor 52 to headstock 55 may be toothed "timing belts" if desired. A pair of massive ellipsoidal handles 59 provide sturdy handgrips by which the operator may lift and maneuver the plate 51 carrying its associated sub-assemblies to position and guide the lathe device 24 during each cutting operation.

Headstock and bearing

Headstock 55 is provided with a torque-transmitting screwdriver blade key 63 protruding radially therefrom near its torque tip for engagement with a screw head type slot 64 formed in the headstock end of the specimen workpiece 27, which is also provided with a conical socket 65 adapted to receive the conical tip of headstock 55 (FIGURES 6, 8). The opposite tailstock end of workpiece 27 is provided with a similar tailstock socket but there is no need for transmission of torque to the tailstock and the key and slot arrangement is omitted from the tailstock end of the workpiece.

The headstock bearing securing the headstock 55 for rotation, driven by the speed reducing belts and sheaves of drive train 53, is secured within the headstock bearing housing 56, which is anchored by through bolts 61 to the base plate 51. The headstock bearing is a roller bearing of standard manufacture held in a press fit in a suitable bored hole passing through the housing 56.

Beneath the headstock housing 56 is a footscrew 62 threaded into the underside of base plate 51 and having an enlarged cylindrical head protruding beneath base plate 51 to form a foot supporting the lathe device 24 on worktable 23, for the enlarged cylindrical head of footscrew 62 protrudes beneath the base plate 51 to rest upon worktable 23. As shown in FIGURE 1 and at the right hand side of FIGURE 6, a second footscrew 62 is secured to the underside of base plate 51 beyond the tailstock housing 58, and a third footscrew 62 is secured protruding beneath the underside of base plate 51 under the lathe drive motor 52. Together, these three footscrews 62, all resting on worktable 23, provide three-point sliding support for the portable, manually positioned lathe device 24.

Tailstock and bearing

The tailstock 57 is provided with a similar conical tip engaging workpiece 27, and tailstock 57 is mounted in a similar standard, commercial roller bearing which is loosely mounted for telescoping axial sliding movement within the tailstock bearing housing 58. The tailstock bearing 66 is positioned behind a tailstock cover plate 67 secured to the workpiece end of housing 58 and provided with a central aperture closely accommodating the tailstock 57. The opposite end of the bore passing axially through the tailstock bearing block 58, slidingly accommodating the tailstock bearing 66, is covered by a similar bearing cover plate 68 having no central aperture, and both cover plates are anchored by screws to the bearing block 58. The remote end of the tailstock 57 protrudes from its bearing 66 and is surrounded by a washer 69 and a tailstock biasing spring 71 compressed between the bearing cover plate 68 and the washer 69 to urge the tailstock 57 toward the headstock 55, with the conical tip of the tailstock 57 protruding through the central aperture of the tailstock cover plate 67.

The lathe devices 24 of this invention are adapted to accommodate workpieces 27 of many different lengths by virtue of the adjustable positioning of the tailstock bearing block 58 in a selectable plurality of positions determined by a series of mounting holes 72 positioned in a spaced array along the forward edge of the base plate 51 accommodating mounting bolts 73 passing upwardly through a selected pair of the holes 72 and threaded into the underside of the tailstock bearing block 58 to anchor it at each predetermined position on the base plate at a preselected distance from the headstock 55. The resilience of spring 71 permits the tailstock 57 to be drawn away from headstock 55 for the insertion of the workpiece 27; spring 71 thereupon urges tailstock 57 toward the workpiece to hold the workpiece in a clamping engagement between headstock 55 and tailstock 57 as shown in FIGURES 5 and 6.

If the user wishes to clamp the tailstock 57 and its bearing 66 in a particular position spaced away from headstock 55, he may do so by use of the tailstock bearing setscrew assembly shown in FIGURE 7, which is a sectional view taken along the lines 7—7 in FIGURE 6. As there shown, a crescent-shaped cavity 74 forming a radial extension of the central portion of the bore in bearing block 58 receiving tailstock bearing 66 extends rearwardly toward the rear surface of the bearing block 58, and a crescent-shaped shoe 75 is positioned in cavity 74 for clamping engagement with the periphery of bearing 66, against which it is urged by a setscrew 76, threaded through a threaded aperture in the rear wall of bearing block 58 extending into cavity 74. Unless setscrew 76 is tightened, however, shoe 75 is not clamped against bearing 66, which is therefore free to slide axially within the central bore of bearing block 58 as described.

Guide templates

Operation of the movable lathe device 24 to bring the workpiece 27 into engagement with the grinding wheel 21 in each of its successive advanced positions is made simple and convenient by the use of the template 26, anchored by two thumb screws 77 passing through alignment holes in the ends of template 26 and threadedly engaged with threaded alignment holes in the upper surfaces of bearing blocks 56 and 58.

The central leading edge of template 26 is provided with the guide surface 28 which may be shaped, for example, as a setback portion joined by curved ends to the front edge of the template 26, as shown in FIGURES 2 and 5. The length and shape of the guide surface 28 are combined with the radius of the semi-circular peripheral cross section of wheel 21 to determine the final shape of the workpiece 27 formed during the successive operations shown in FIGURES 8 through 11. With the form of guide surface 28 shown in the drawings, for example, combined with the thin grinding wheel 21 having a semicircular peripheral cross section, a standard ASTM miniature tensile test specimen 27c shown in FIGURE 11 may be formed with ease and convenience from a standard bar stock specimen 27 such as the one shown in FIGURE 8.

Operation

The successive operations employed begin with the positioning of the grinding wheel 21 at the starting position shown in FIGURE 1, after which the lathe device 24 with the specimen 27 mounted between headstock 55 and tailstock 57 is positioned with guide surface 28 of template 26 held firmly against guide sleeve 25 on the pedestal 46 of the grinding machine 20, and with all three footscrews 62 resting squarely upon the worktable 23, in the position shown in FIGURES 1 and 2.

The lathe drive motor 52 and speed reduction drive train 53 are actuated to rotate the headstock 55 and the specimen 27 at a preselected feed of 250 r.p.m. for example. Manual feed wheel 22 is then turned to advance grinding wheel 21 to the initial cut position shown in FIGURE 3, where it just touches the spinning corner edges of the rotating workpiece 27. By manipulating the handles 59, the operator then maneuvers the lathe device 24 from side to side, with guide surface 28 sliding from end to end along the guide sleeve 25, bringing the periphery of wheel 21 in contact with the entire length of workpiece 27 to produce the partially machined workpiece 27a shown in FIGURE 9.

Hand wheel 22 is then turned by the operator with the help of feed dial 36 to advance grinding wheel 21 by the precise fine feed increment desired, and lathe device 24 is again maneuvered from side to side to move guide surface 28 from end to end in contact with guide sleeve 25 to bring the high-speed grinding wheel 21 into cutting engagement with the entire periphery of the rotating workpiece 27

Successive fine-feed machining operations are performed in this manner until grinding wheel 21 has been advanced to the final position 21a shown in FIGURES 1 and 4. The cooperation of the template 26 and guide sleeve 25 with the radius of the semi-circular peripheral cross section of wheel 21 have now cooperated with the operator's side-to-side oscillating manipulation of the lathe device 24 to reduce the workpiece 27 to specimen 27b shown in FIGURE 10, which may then have its ends removed to form a standard ASTM test specimen 27c shown in FIGURE 11.

The use of precision templates with substantially automatic and highly simplified manual operation of the apparatus permits the production of a wide variety of different sizes and shapes of workpieces by operators having a minimum of skill in machining operations. Either the "Tensil Grind" machine shown in FIGURES 1 and 2 or the "Tensil Kut" machine shown in my U.S. Patent No. 2,896,511 may be used in cooperation with the "Tensi-Lathe" device 24 shown in the drawings, since either high-speed milling or high-speed grinding operations may be performed upon the workpiece 27 held between headstock 55 and tailstock 57. Because of the high speed of the cutting tool and the very small feed increments employed, the techniques of this invention are not affected by the "interrupted" cut produced by the initial cutting operations of the rotating square specimen 27 to produce the initial machining of the corners thereof, as illustrated in FIGURES 3 and 9. This is a unique advantage of the techniques of this invention in which both the workpiece and the cutting tool are rotating about their own axes of rotation, the workpiece at a speed of 250 r.p.m. and the cutting tool at 20,000 r.p.m., for example.

A conventional lathe uses a stationary single point tool bit to remove metal from the sample while it is slowly rotated on centers. The heavy chip loads develop high cutting forces and require large drive motors (1 to 5 H.P.) to rotate the sample. These heavy forces in turn demand massive lathe beds and rugged tool rests to provide sufficient machine rigidity.

By comparison, the compact lathe device 24 weighs less than 15 pounds and requires only a $\frac{1}{10}$ H.P. drive motor 52 to provide turning force to the sample during machining. This unique lathe is based on a new concept wherein the actual cutting forces are reduced to such small amounts through the powerful 20,000 r.p.m. "Tensil Kut" or "Tensil Grind" motors that lathe device 24 requires only a minimum of power for sample rotation while machining steel or aluminum samples.

Round specimens machined with lathe device 24 include all the advantages obtained with "flat" specimens precision contour milled with "Tensil Kut" machines. The specimen configurations are traced within tolerances 0.001", the machined surfaces are essentially free of induced cold working, while the simplicity of operation permits unskilled technicians to accurately prepare round specimens from aluminum in less than three minutes and steel samples in five minutes.

Furthermore, if desired, the lathe drive motor 52 may be operated at much higher speeds—5,000 r.p.m., for example—at which high speeds a fine grade of emery cloth or other fine abrasive may be used to polish the specimen 27b before it is removed from the lathe device 24.

While the objects of the invention are efficiently achieved by the preferred forms of the invention described in the foregoing specification, the invention also includes changes and variations falling within and between the definitions of the following claims.

I claim:
1. A method of producing physical test specimens from bar stock of metallic and non-metallic materials comprising in combination the steps of:
 (A) supporting a cutting tool for machining rotation with its cutting edge adjustably positioned between an underlying worktable and a guide sleeve positioned above the worktable and adjustably spaced from the cutting edge of the cutting tool,
 (B) supporting a workpiece length of bar stock for rotation about a longitudinal axis between the worktable and an overlying guide template having a guide surface of predetermined shape,
 (C) independently rotating both the workpiece and the cutting tool about their respective axes,
 (D) progressively reducing the spacing between the guide sleeve and the cutting edge of the cutting tool,
 (E) moving the rotating workpiece to and fro endwise in repeated reciprocation cycles while maintaining the template guide surface in guiding engagement with the guide sleeve.

2. The method defined in claim 1 wherein the progressive reduction of spacing is performed in successive fine feed increments each completed between reciprocation cycles of the rotating workpiece.

3. The method defined in claim 1 wherein the cutting tool is a high-speed grinding wheel.

4. The method defined in claim 1 wherein the cutting tool is a high-speed milling cutter.

5. Apparatus for producing physical test specimens from bar stock of metallic and non-metallic material comprising in combination:
 (A) a machine tool having
  a worktable,
  a rotatable cutting tool having a cutting edge spaced above a central region of the worktable, and
  a guide sleeve embracing the cutting edge and spaced above the worktable,
 (B) a movable lathe device having
  a rotatable headstock and driving means for rotating the headstock,
  a rotatable tailstock aligned with and adjustably movable toward and away from the headstock,
  a base plate supporting the headstock, tailstock and drive means,
  a template having a guide surface and anchoring means for securing the template above the headstock and the tailstock with the guide surface presented above a workpiece held between the headstock and tailstock,
 (C) and means for positioning and moving the lathe device above the worktable with the template guide surface maintained juxtaposed in guiding engagement with the guide sleeve.

6. The combination defined in claim 5 wherein the rotatable cutting tool is a high-speed grinding wheel.

7. The combination defined in claim 5 wherein the rotatable cutting tool is a high-speed milling cutter.

8. The combination defined in claim 5 including feed adjustment means connected to vary the space between the guide sleeve and the cutting edge.

9. The combination defined in claim 8 wherein the feed adjustment means is a manual feed wheel rotatably mounted near the front of the worktable.

10. The combination defined in claim 6 including a movable wheel dressing tool positioned for dressing engagement with the cutting wheel.

11. The combination defined in claim 5 wherein the means for positioning and moving the lathe device includes two upstanding handles.

12. The combination defined in claim 11 further including three feet protruding downwardly from the movable lathe device for sliding engagement with the worktable.

13. The combination defined in claim 5 wherein the base plate is provided with means forming an arrayed series of mounting holes cooperating with mounting bolts removably extending through the mounting holes to secure a tailstock bearing block in one of a selectable plurality of mounting positions.

14. The combination defined in claim 5 wherein the tailstock is anchored in a tailstock bearing axially slidably mounted within a bore of a tailstock bearing block for telescoping movement toward and away from the headstock, and including resilient means biasing the tailstock toward the headstock.

No references cited.

WILLIAM W. DYER, JR., *Primary Examiner.*

GERALD A. DOST, *Examiner.*